Nov. 12, 1935.  W. F. SCHLOTHAN  2,020,579
MEANS FOR REMOVING THE SKIN FROM FISH
Filed June 28, 1932  2 Sheets-Sheet 1
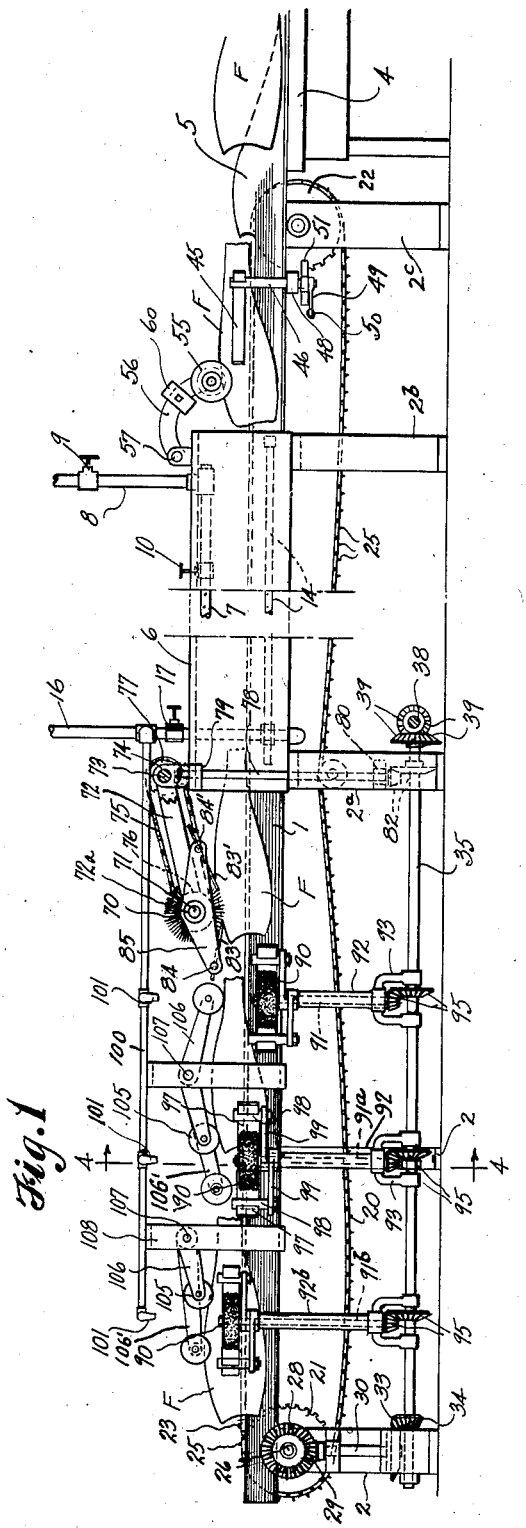
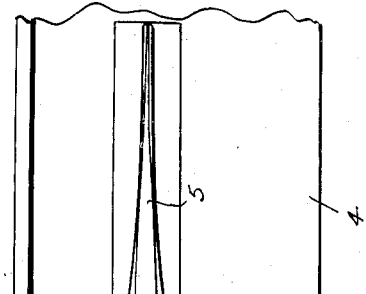
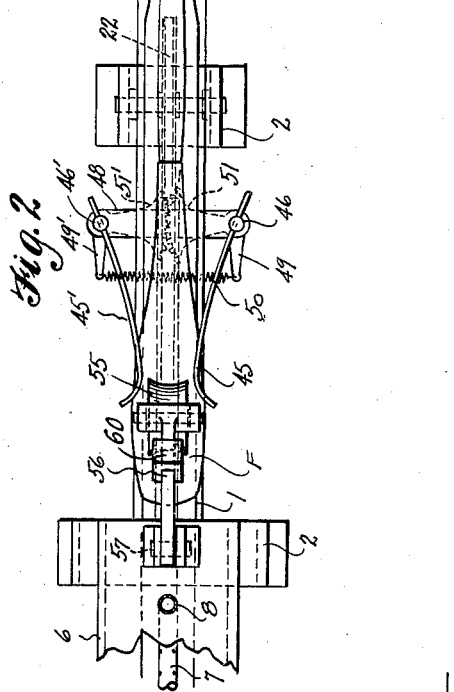
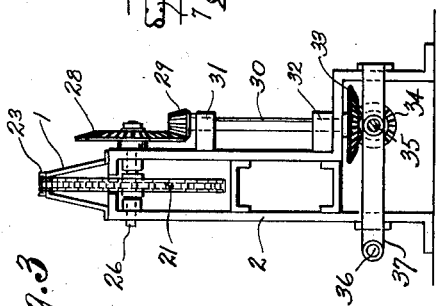
INVENTOR
WILLIAM F. SCHLOTHAN
BY
Cook + Robinson
ATTORNEY

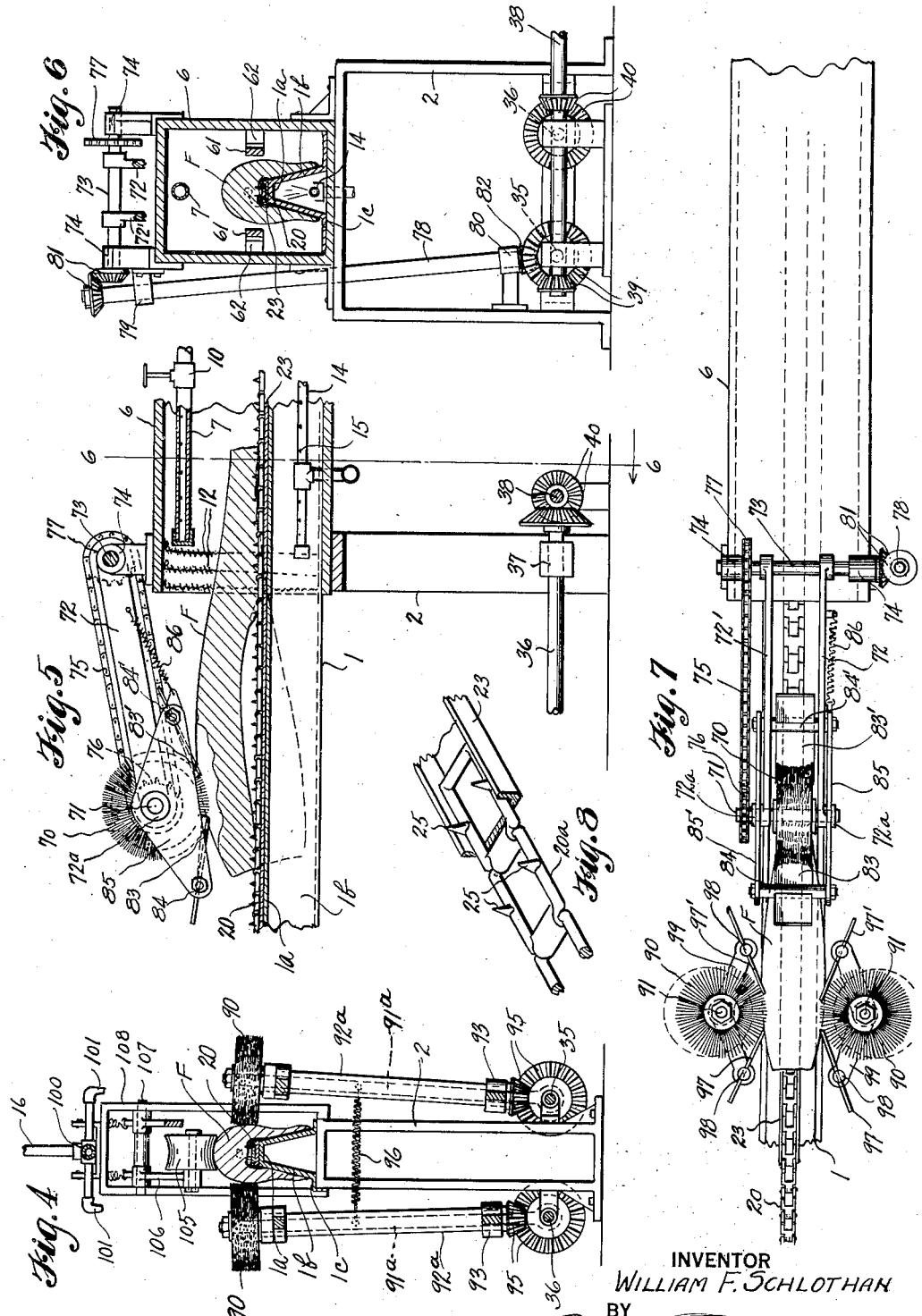

Patented Nov. 12, 1935

2,020,579

UNITED STATES PATENT OFFICE 2,020,579

MEANS FOR REMOVING THE SKIN FROM FISH

William F. Schlothan, Ketchikan, Territory of Alaska

Application June 28, 1932, Serial No. 619,661

12 Claims. (Cl. 17—2)

This invention relates to fish cleaning machines and it has reference more particularly to a means for removing the skin from fish, such as salmon, preparatory to their being canned.

Heretofore, it has been the general practice to butcher and clean the fish, then to cut them into can length pieces, and then to can the pieces without removing the skin. This was done not because it is more desirable to retain the skin, but because of the time required and additional expense of removing the skin by hand which, to my knowledge, is the only method heretofore attempted.

Therefore, it has been the principal object of this invention to provide a novel means for a quick, satisfactory and easy removal of skin from fish preparatory to canning, and to provide a mechanism whereby this removal of skin may be done mechanically and at a relatively small cost, and without in any way damaging the product to be canned.

More specifically stated, the objects of the invention reside in the provision of a machine for the above purpose that is adapted to be located, with convenience, in the usual canning line between the butchering station and the slimer, and which will operate to convey the butchered fish, in succession, as they are received from the butchering machine, along a horn and through a chamber in which steam is applied to the fish in proper amount and manner to loosen the skin from the flesh, then to convey the fish from the steam chamber along the horn between a series of brushes whereby the loosened skin is brushed from the body of the fish to leave the body clean and undamaged.

It is also an object of this invention to provide a novel method of preparing salmon for canning.

Other objects of the invention reside in the construction and specific arrangement of the various brushes and in the means for guiding and gauging their action. Also, in the various details of construction and in the combination of parts whereby the fish are properly supported and conveyed through the steam chamber, and past the various brushes.

In accomplishing these and other objects of the invention, I have provided the improved details of construction, the preferred forms of which are illustrated in the accompanying drawings, wherein—

Fig. 1 is a side elevation of a fish skinning mechanism embodied by the present invention.

Fig. 2 is a plan or top view of the receiving end portion of the horn to which the fish are applied for conveyance through the machine; this view showing also the means for properly positioning the fish on the horn and for pressing them onto the pins of the conveyor chain belt.

Fig. 3 is an elevation, or end view of the machine at the delivery end.

Fig. 4 is a cross section of those parts of the machine closely adjacent the section line 4—4 in Fig. 1.

Fig. 5 is a portion of the mechanism, shown in vertical section lengthwise of the horn and illustrating the location and action of the first brush in the series whereby skin is removed from the back of the fish.

Fig. 6 is a cross section through the steam chamber, of parts immediately adjacent the section line 6—6 in Fig. 5.

Fig. 7 is a plan, or top view, of a part of the machine, showing the back brush and the first set of the series of side brushes.

Fig. 8 is a perspective view of a short section of the conveyer chain.

Briefly described, the present machine comprises an elongated horn along which the fish, previously butchered, with heads, fins and tails removed, split open along the belly and interiorly cleaned, are conveyed in succession by a belt conveyer which travels in a guideway along the top edge of the horn; the belt being of link form and provided with upstanding pins or prongs to provide a holding connection with each fish placed thereon. The horn extends through an elongated chamber in which steam, hot water, or a mixture of hot water and steam may be ejected against or about the fish to loosen the skin from the flesh. Then after the fish have been steamed they are conveyed from the chamber past a series of revolving brushes which operate against the back and sides thereof to brush the loosened skin therefrom.

Referring more in detail to the drawings—

I designates the horn along which the butchered fish are advanced. This horn is supported horizontally and at a convenient working height by a plurality of frames 2, 2a—2b—2c of a character, and so arranged, as to give the horn rigid and substantial support. The horn preferably is of ridge form in cross section as seen best in Figs. 4 and 6, and is formed from sheet metal or other suitable material bent into shape to provide a narrow, flat top suface 1a, outwardly inclined opposite side walls 1b and lower edge flanges 1c which add rigidity and provide means for securing it to the supporting frames.

At its receiving end, the horn overlies a receiving or feed table 4, as seen in Figs. 1 and 2, and it is formed with a sort of fin 5 tapering down to a thin edge so that the fish may be easily placed thereon, as will be more fully described later.

Relatively close to its receiving end, the horn 1 extends lengthwise through a steam chamber 6, closed at its top, bottom and opposite sides but open at its ends for the passage of the fish therethrough along the horn. A steam discharge pipe 7 is supported lengthwise within the upper portion of the steam chamber and this is connected to a steam supply pipe 8 controlled by a valve 9. Small ports or perforations are provided along this pipe 7 for the distribution of steam within the chamber along the horn in such direction as not to be discharged directly against the fish but to be deflected thereagainst from the side walls of the chamber, thus to be applied equally to all parts of the skin surface of the fish. The steam chamber should be of such length that, dependent on the rate of travel of the conveyer, each fish will be properly and effectively steamed without being cooked. Control or cut off valves, as at 10, may be located at intervals along the steam pipe 7 to be opened or closed, as needed, to increase or decrease the delivery of steam to a suitable amount.

To confine the steam to the chamber against outflow through its open ends, curtains 12 are hung loosely within the end portions as will be seen in Fig. 5. These curtains are of canvas or similar material and do not interfere with travel of the fish but effectively retain the steam. Also, to prevent sticking of the fish to the horn, which would result incident to overheating of the horn by the steam, I have provided a cold water spray pipe 14 within that portion of the chamber and this is provided with closely placed ports 15 from which small jets of water will be discharged against the interior of the horn to keep it cool. A water supply pipe 16 connects with pipe 14 and this has a valve 17 therein for controlling the flow of water.

For the purpose of conveying the fish along the horn, through the steam chamber and then past the various brushes, I provide a conveyer chain belt 20 which travels about supporting sprocket wheels 21 and 22 mounted at opposite ends of the horn in frames 2. The top run of the conveyer belt is slidably contained within a channel iron 23 that is fixed lengthwise upon the top edge of the horn and extends from one sprocket wheel to the other. This conveyer is of link chain construction and each link 20a, as shown in Fig. 8, is provided at opposite sides with upstanding prongs 25 which are arranged so that when a fish is placed on the belt, these prongs will pierce it to provide a holding connection.

The conveyer belt is driven by means of a shaft 26 which mounts the sprocket wheel 21. This shaft is revolubly mounted in bearings provided in the end frame 2 and, as seen in Figs. 1 and 3, a bevel gear 28 is keyed to the shaft 26 and driven by a smaller bevel gear 29 on a shaft 30 mounted vertically in bearings 31 and 32 fixed to the end frame 2. The shaft 30, in turn, is driven by a bevel gear 33 fixed on its lower end in mesh with a bevel gear 34 on a driven shaft 35 extending lengthwise of the machine.

As seen in Figs. 3, 4 and 6, the shaft 35 and a similar shaft 36 are supported in parallel relation lengthwise of the machine and are revoluble in suitable bearings 37 attached to the horn mounting frames 2. These shafts which drive the side brushes, presently described, are driven in unison from the main drive shaft 38 which is disposed transversely of the machine as shown in Figs. 5 and 6, and is operatively connected to the shafts 35 and 36 respectively by sets of bevel gears 39 and 40.

In a preferred arrangement, the fish, individually designated by character F, are delivered from the butchering machine, not shown, with heads and tails and fins removed, the belly split open lengthwise and the interior cleaned. An attendant stationed at the table 4 picks up the fish and slides them head end first and back up onto the fin 5 to open them up, and then onto the horn 1 so that the sides of the fish body overlie the opposite sides of the horn and the fish rests lengthwise upon the conveyer chain 20 as seen best in Figs. 4 and 5. The attendant advances the fish onto the horn so that it will be taken up by the conveyer chain; then as the fish passes onto the horn, it is properly alined thereon by a pair of spring like centering arms or levers 45 and 45' which extend at opposite sides of the horn in the direction of travel of the fish and yieldingly engage with the opposite sides of the fish, as shown in Fig. 2. These arms are fixed, respectively, in pivot posts 46—46' at opposite sides of the horn; the posts being revolubly mounted at equal distances from the horn by a supporting cross bar 48. Arms 49—49' are fixed to the lower ends of these posts, as in Fig. 2, and are connected by a coiled spring 50 which operates to yieldingly urge the fish centering arms inwardly against each fish as it passes along the horn. Also, there are geared segments 51—51' fixed respectively on the lower ends of the posts and these are of equal radius and they mesh together so that the arms 45—45' will be caused to open apart or move toward the horn in equal amounts; thus, when a fish passes between the swinging ends of the arms, the arms yield outwardly but in equal amounts to centrally locate the fish on the horn. The spring 50 retains them tightly against the fish as it passes along the horn.

While the fish is thus centrally located on the horn and upon the conveyer chain, it is pressed downwardly to cause the prongs 25 of the chain to pierce the fish at opposite sides of the back bone, as seen in Fig. 4, thus to provide a secure holding connection with the chain for moving the fish forwardly. The pressing means consists of a roller 55 rotatably mounted at the swinging end of an arm 56 which is pivoted, as at 57, on the steam chamber, or other support. The roller is centrally located over the horn and has a transversely concave surface which has rolling contact with the back of the fish as seen in Fig. 1. A suitable weight, as at 60, may be applied to the arm to cause the roller to press down against the fish with sufficient force to cause it to become secured effectively to the conveyer chain through the medium of the prongs 25.

As each fish passes through the steam chamber 6 it is held against possible displacement between guide rails 61—61 as seen in Fig. 6, which are supported parallel with the horn by brackets 62 fixed to the side walls of the chamber. In the chamber, the fish receive the steam bath whereby the skin is caused to be loosened from the body. The amount of steaming necessary is usually determined by trial and is dependent to some extent on the speed of the conveyer, the length of the chamber and character or kind of fish.

As the fish are carried along the horn from the chamber after steaming, the skin is brushed therefrom. For this purpose, I have provided a top or back brush 70 that is keyed on a shaft 71 mounted at the ends of a pair of parallel arms 72—72' swingingly mounted on a cross shaft 73 supported revolubly in bearings 74 on the steam chamber. The brush is so located that it will rest upon the back of the fish and it is rotatably driven by a sprocket chain belt 75 which extends about sprocket wheels 76 and 77 fixed respectively on the shafts 71 and 73. The shaft 73 is driven by connection with shaft 35 as seen in Figs. 1 and 6, wherein 78 designates a connecting shaft mounted in bearings 79 and 80 and connected at its upper end by a set of bevel gears 81 with shaft 73 and connected at its lower end by a set of bevel gears 82 with shaft 35. The connection is such that the portion of the brush 70 that contacts the fish will rotate in the direction of travel of the fish and the brush is of such width and has its brushing surface cupped to fit substantially the curvature of the back of the fish thus to remove a relatively wide strip of the skin from this portion of the fish as it advances past the brush.

To support the brush properly upon the fish and to prevent its tearing the flesh or digging in too deep, I have provided a pair of guard plates 83 and 83'. These plates are mounted adjustably in supports 84 and 84' located forwardly and rearwardly of the brush in a rocker frame comprising a pair of plates 85—85' disposed along opposite sides of the brush and centrally pivoted for rotative movement about hub portions 72a of the arms 72—72' which support the brush mounting shaft 71. These guard plates are adjustably mounted with ends extended downwardly and inwardly, toward each other and spaced somewhat apart to provide space for the brush to engage the fish between their ends. The plates are transversely curved to fit within the curvature of the brush and also to conform to the fish, and they are adjusted so as to act as a gauge for controlling the depth and pressure of the brush against the fish. The pivoting action of the rocker permits the guard plates to adjust themselves automatically to the curvature of the fish back, in the longitudinal direction, and a spring 86, as seen in Figs. 5 and 7, is attached to the rocker and to an arm 72 to prevent the rotative action of the brush or frictional engagement of the fish with the plates, from rotatably moving the rocker beyond a certain extent.

As the fish advances past the back brush it contacts successively with a plurality of side brushes arranged in pairs at intervals along the horn, the brushes of each pair engaging opposite sides of the fish, to remove a strip of skin therefrom, and brushes of successive pairs are at different elevations so that after the fish has passed the series of brushes, all skin will have been removed therefrom.

As seen in Fig. 4, the side brushes 90 are mounted by driving shafts 91 91a—91b contained revolubly in tube 92 92a—92b. At its lower end each tube is mounted by a bracket 93 and the brackets for all brushes at one side of the horn pivot about the shaft 35, and those at the other side, pivot about shaft 36. The shafts 91 are all driven by sets of bevel gears, as at 95 from the shafts 35 and 36 and paired brushes are drawn inwardly toward opposite sides of the horn by coiled springs 96 which connect the upper ends of the tubes 92, as in Fig. 4, containing the shafts of paired brushes.

Each brush is provided also with guard plates 97—97' to engage the fish as previously explained, in connection with the back brush. As seen in Fig. 7, the guard plates are disposed in pairs at each side of the fish. They are adjustably mounted by posts 98 held in brackets 99 attached to the tubular supports 92. The inner ends of the plates are spaced to permit operation of the brush between them, and at their ends they engage the fish to adjust the pressure of the brush to prevent tearing the meat.

The guard plates 97 and 97' serve also to keep the brushes clean and by providing for delivery of a jet of water onto each brush, the skin will not stick or cake on the brush or on the plates. A water supply pipe 100 for this purpose extends along the horn and jets 101 are provided at proper places to deliver water onto the brushes. The pipe 100 connects, as seen in Fig. 1, with water pipe 16.

To insure that the brushes, acting on the fish, will not cause the fish to become loosened from the conveyer chain, I provide rollers 105 carried by arms 106 and 106' that are pivoted by shafts 107 in brackets 108 supported by the horn or frames. These rollers bear downwardly against the fish at the brushing stations and act to hold them in place. One or more of such rollers may be used at each brushing station.

With the machine so constructed, it is only necessary that the operator properly place the fish on the horn and then the conveyer carries the fish through the steam chamber and past the several brushes which remove the skin which has been loosened by the steaming operation. Such a device operates at small cost to quickly and effectively and without waste or damage, to remove the skin from the fish, and fish so prepared are quite superior in quality and more desirable for canning purposes than those not skinned.

In the foregoing description I have specified in particular the use of steam for loosening the skin from the body of the fish, and the use of revolving brushes for removing the loosened skin. It is to be understood, however, that I do not wish to confine myself only to the use of steam and to the use of brushes since it is possible, and in some instances may be more desirable, to use hot water in place of steam and to use other means in place of brushes for removing the skin. For example, hot water, a mixture of hot water and steam, or even hot gases or flame may be applied to accomplish the same result as that accomplished by the steam. Also, in place of the revolving brushes, scrapers of various types might be used, or even suction devices or vacuum chambers arranged to receive the fish in such manner that the loosened skin may be removed thereby. Therefore, it is not desired that the claims appended hereto be construed only in the light of the machine illustrated, but shall be given an interpretation commensurate with the scope of the invention that has been disclosed.

By use of the above described mechanism, in connection with the mechanism of the usual canning line, I have provided for carrying out a new method of preparing salmon for canning purposes; this method consisting of first butchering the fish in the usual manner; then removing the skin from the fish; then delivering the fish with skin removed to the cutters and finally to the can filling machines; all of the above machines being old and well known in the canning art, particularly with respect to the canning of salmon.

Having thus described my invention, what I claim as new therein and desire to secure by Letters Patent is—

1. In a device of the character described, a steam chamber, a horn leading through and extended beyond the chamber and on which a butchered fish may be supported lengthwise, brushes arranged adjacent the extended end of the horn and a conveyer operating along the horn and whereby fish placed on the horn will be conveyed progressively through the chamber for treatment by the steam to loosen the skin and then into contact with the brushes for removal thereby of the skin from the body.

2. A device of the character described comprising a steam chamber, means for admitting steam in regulated amounts thereto, a horn leading into and from the chamber on which a butchered fish may be supported lengthwise, a conveyer belt supported by and operating along the horn, means on the belt for effecting a holding connection with fish placed on the horn and whereby the fish will be moved with the conveyer along the horn and through the chamber for treatment by the steam for loosening the skin, and a series of brushes arranged adjacent the horn beyond the chamber for brushing contact with the fish, after passing through the chamber, for removing the loosened skin from the body.

3. A device of the character described comprising a steam chamber, means for supplying steam to the chamber in regulated amounts, a feed table at the receiving end of the chamber, a horn leading from the table through and beyond the chamber, a series of revolving brushes arranged along the delivery end of the horn, and a conveyer operable along the horn and whereby fish may be conveyed along the horn from the table, first through the steam chamber for the loosening of the skin by the application of steam, and then past the brushes for removal thereby of the loosened skin from the body.

4. A device of the character described comprising a steam chamber, a horn leading through the chamber, a conveyer belt operating lengthwise of the horn and on which fish may be placed and moved along the horn through the chamber, means at the receiving end of the horn for centering the fish relative thereto and means along the delivery end of the horn, after passing through the chamber, for brushing the skin, loosened by the application of steam in the steam chamber, from the body.

5. In a device of the character described, a steam chamber, a horn leading through the chamber upon which a fish may be placed for travel, a conveyer belt operable to advance the fish on the horn through the chamber for treatment by steam to loosen the skin, brushes operable against the fish after passing from the chamber to remove the loosened skin, and means for cooling that portion of the horn within the steam chamber to prevent sticking of the fish thereto.

6. A device of the character described, comprising a steam chamber, means for controlling the admittance of steam thereto, a horn extending longitudinally through the chamber on which a longitudinally split fish may be mounted for movement, a conveyer belt operating along the horn and having pins therein arranged for holding contact with a fish placed thereon to move the fish along the horn, means at the receiving end of the horn for centering the fish relative thereto and to the conveyer, a pressure roll arranged to engage the fish when placed on the horn to press it onto the conveyer pins and rotary brushes arranged along the delivery end of the horn for contact with fish passing therealong; said conveyer operating to convey the fish placed on the horn through the steam chamber for treatment by steam to loosen the skin and then past the brushes for removal of the loosened skin from the body.

7. A device as in claim 6 wherein the brushes are supported by means outwardly yieldable to accommodate the passing of the fish.

8. A device as in claim 6 wherein the brushes are mounted for rotation in supports that are yieldable from and toward the horn and wherein each brush has guard plates adjustably fixed to the supports to engage the fish thereby to regulate the pressure of the brush and cause it to accommodate itself to the fish.

9. In a device of the character described an elongated steam chamber, means for controlling the admittance of steam to the chamber, a horn leading lengthwise through the chamber and beyond the opposite ends thereof, a conveyer chain belt operating lengthwise of the horn along the top edge thereof and whereby the fish, longitudinally split and placed upon the horn lengthwise thereof, will be conveyed through the steam chamber and to the opposite end of the horn and a series of brushes arranged along the horn at the delivery end for brushing contact with the fish delivered through the steam chamber; one of said brushes being above the horn to brush the skin from the back of the fish and the other of said brushes being arranged in pairs at opposite sides of the horn and at different elevations for removal of skin from the sides of the fish.

10. A device as in claim 9 wherein means is provided whereby all brushes are revolubly driven in direction of travel of the fish.

11. In a device of the character described, a steam chamber, brushing devices and a conveyer by which butchered fish may be moved endwise through the chamber for treatment by steam for loosening the skin thereon, then past the brushing devices to effect the removal of the skin.

12. In a device of the character described, a steam chamber, a guide, brushing devices at opposite sides of the guide and a conveyer by which fish may be moved progressively along the guide and through the chamber for treatment by steam to loosen the skin thereon, then between the brushing devices for its removal.

WILLIAM F. SCHLOTHAN.